Sept. 2, 1958  G. C. MAYER  2,850,018
WEIGHT CONTROL SYSTEM FOR CIGARETTE MAKING MACHINE
Filed July 30, 1956  2 Sheets-Sheet 1
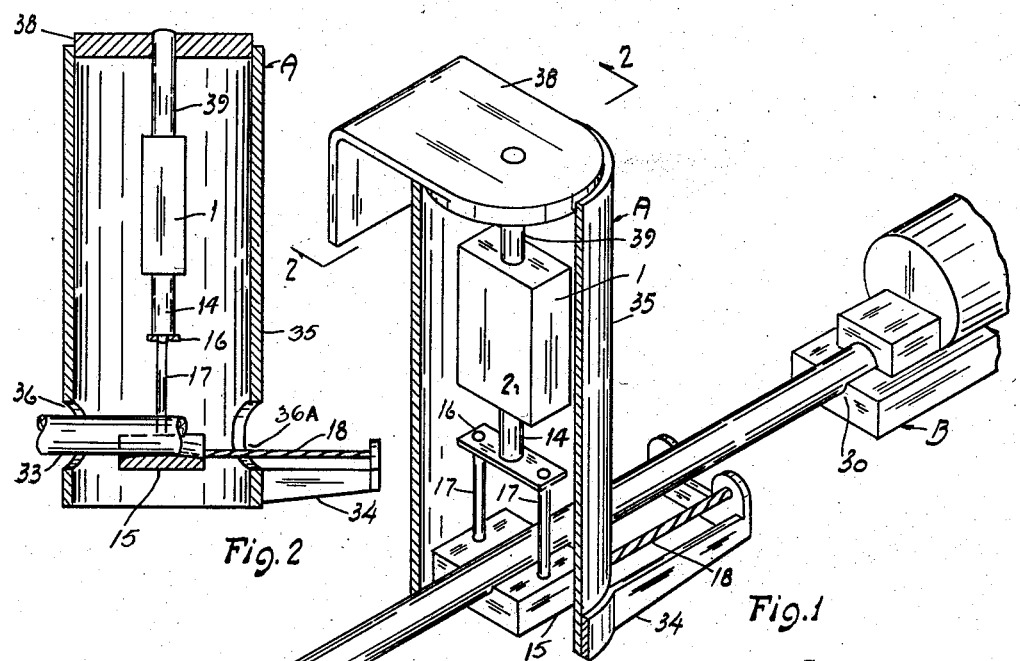
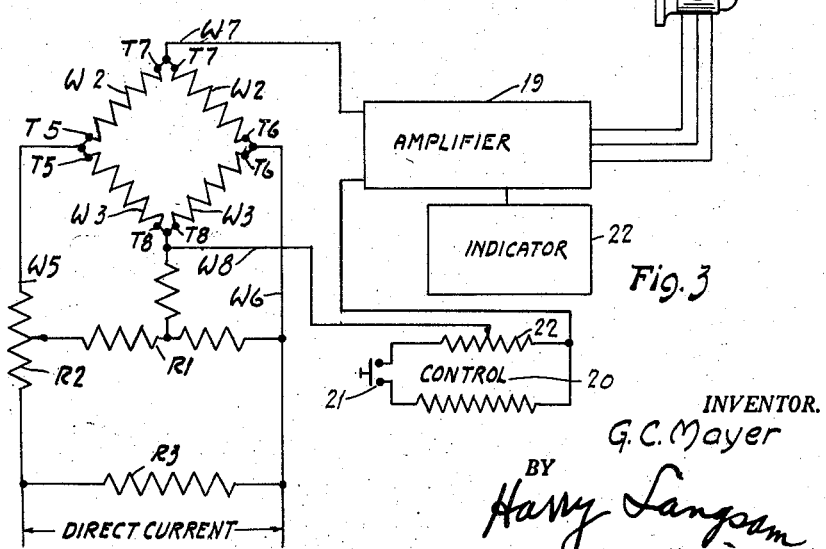
INVENTOR.
G. C. Mayer
BY
Harry Langsam
Attorney United States Patent Office 2,850,018
Patented Sept. 2, 1958

2,850,018

WEIGHT CONTROL SYSTEM FOR CIGARETTE MAKING MACHINE

Gerald C. Mayer, Willow Grove, Pa., assignor to CDC Control Services, Inc., a corporation of Pennsylvania Application July 30, 1956, Serial No. 600,846

4 Claims. (Cl. 131—22)

My invention relates to weight actuated controlling devices and more particularly relates to the application of such devices to control fabricating and extruding machines that produce products of uniform section.

In most fabricating and extruding machines for products of uniform section the controls are manual in nature and adjustment of the feeding means is made after samples of the finished product are weighed. This method of weight and uniformity control is especially true in the fabrication of cigarettes in continuous form. In the following I will describe the application of my weight actuated controlling device to a cigarette making machine; however, it is to be understood that my improved methods of applying the weight actuated controls is applicable to any machine that produces products by extrusion or by the continuous fabrication of a product of uniform section.

The prior methods of weight and uniformity control as described above are time consuming, laborious, and results in many articles that are substandard. It is therefore, the principal object of my invention to apply a weight controlling means that will continuously check the weight of the product being produced and automatically adjust the feeding means to the end that the product is of a uniform weight for a unit length.

It is an object of my invention to provide a weight control that does not require the continual checking by an attendant.

Another object of my invention is to provide a weight control that is easily adjustable under the control of an electrical circuit.

Another object of my invention is to provide a weight control that can be adjusted and which in turn will make adjustment to the mechanical feed control features of the weighing device.

Other objects of my invention are to provide weighing means of the character described which are easily applied to extruding machines and machines for the fabrication of products of uniform section.

With the above and related objects in view, my invention consists in the details of construction and combination of parts, as will be more fully understood from the following description, when read in conjunction with the following drawing in which:

Fig. 1 is an isometric view showing the weighing unit positioned between the fabricating unit and the cutter unit of a cigarette making machine.

Fig. 2 is a sectional elevational view taken along line 2—2 of Fig. 1.

Fig. 3 is a diagram of the controls and the control mechanism as applied to a cigarette making machine.

Figure 4:
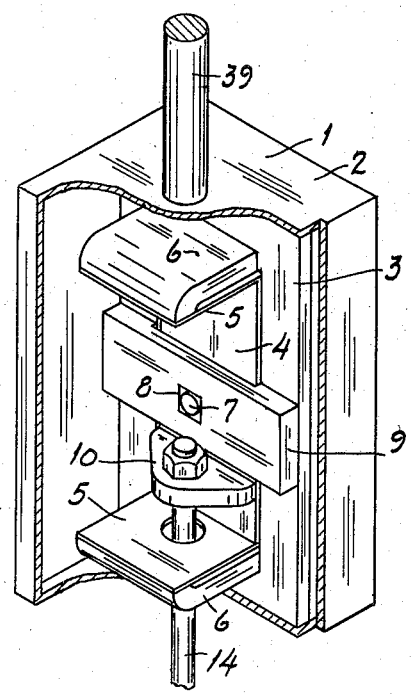
Fig. 4 is an isometric view of the transducer type weighing device as applied to my improved control means and showing the mechanical components of the device.
Figure 5:
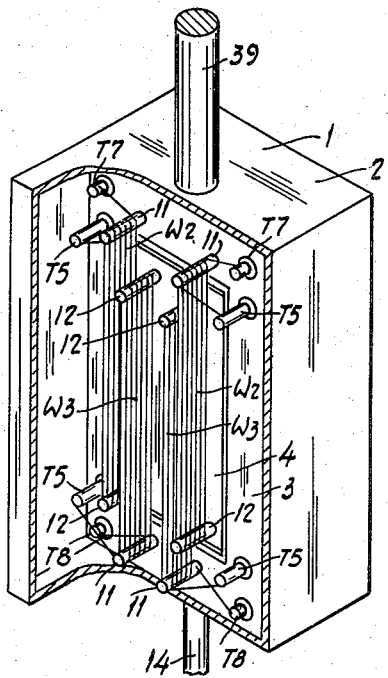
Fig. 5 is an isometric view of the transducer unit showing the electrical components of the device.

Referring in greater detail to the drawings in which I disclose an embodiment of my invention as applied to a cigarette making machine, it will be observed that in the application illustrated, see Figs. 1, 3 and 4, a strain gauge 1 of the unbounded variety mounted in tension as a weight transducer is employed. The transducer type strain gauge 1 employed and as hereinafter described is a commercial article and functions to convert small units of weight into relative fluctuations in an electrical circuit. The fluctuations in the electrical circuit are amplified and are employed to electrically control a reversible motor, which in turn mechanically controls a manual feed control on the fabricating or extruding machine.

The transducer type strain gauge 1 is comprised of a housing 2 enclosing a mounting frame 3. Mounted within the frame 3 is an armature 4 positioned against lateral movement by flexible, horizontal positioning members 5, 5. The flexible horizontal positioning members 5, 5 are fixedly secured at their outer ends by the frame brackets 6, 6, and the inner ends of the flexible horizontal positioning members 5, 5 are fixedly attached to the ends of the armature 4. It will be observed that the positioning of the armature 4 within the frame 3 by the flexible horizontal positioning members 5, 5 permits vertical movement of the armature 4 within the frame 3. As excessive movement of the armature 4 would injure the tension wire elements, a limiting stop is provided in the form of a pin 7 which is fixedly positioned in the armature 4 and projects through a square hole 8 in a stop bar 9. The stop bar 9 is fixedly attached to the frame 3. The armature 4 is provided with a saddle 10 to which is fixedly attached an armature shaft 14. Tension wire elements W2, W2 and W3, W3 are arranged in pairs and are fixedly attached to the frame 3 by posts 11 of insulating material and to the armature 4 by posts 12 also of insulating material. The tension wire pair W2, W2 provides tension on the armature 4 in an upward direction and the tension wire pair W3, W3 provides tension on the armature 4 in a downward direction and thus in cooperation with the flexible horizontal positioning numbers 5, 5, position the armature 4 within the frame 3. It will be observed from the illustrations and above description that any increase in weight on the armature shaft 14 will tend to increase the tension on the wire pair W2, W2 and at the same time decrease the tension in the wire part W3, W3 and conversely any decrease in the weight as applied to the armature shaft 14 will decrease the tension in the wire pair W2, W2 and increase the tension in the wire pair W3, W3. This variation in the tension in the wire pairs W2, W2 and W3, W3 results in a variation in the resistance in the wires comprised in the pairs and the flow of current in the connected electrical circuit, as thereinafter described. Metal terminal posts T5, T5, T6, T6, T7, T7 and T8, T8, positioned in and insulated from the strain gauge frame 3 are provided to terminate the tension wires of the tension wire pairs, W2, W2 and W3, W3.

The tension wire pairs W2, W2 and W3, W3 are connected into the electrical circuit in the form of a Wheatstone-bridge and direct current electricity is fed into the bridge by way of terminals T5, T5 and T6, T6, see Fig. 3. Electrical current control devices, such as fixed compensating resistance R1 together with a variable resistor R2 and a fixed resistor R3 are provided to provide compensating means for the dead weight as applied to the tension wires W2, W2 and W3, W3. The dead weights include the armature 4 and its appurtenances, the armature shaft 14, the cross yoke 16, the parallel support rods 17, 17, the weight platform 15 and a portion of the flexible thrust struts 18, 18. The sum of these weights, as imposed on the tension wires can be compensated and electrically neutralized by the controls R1, R2 and R3 to the end that when no weight is being supported by the weight platform 15 no current will flow in the wires W7 and W8. Adjustment of the controls as described above permits the operator to adjust the controls so that the weight of the connected elements will be cancelled out and only the weight of the product on the weight platform 15 will cause a variation in the electrical current flowing in wires W7 and W8. The varying electrical current emanating from the transducer bridge by way of wires W7 and W8 is fed into a phase sensitive servo amplifier 19, see Fig. 3, by way of a control 20. The control 20 is provided with a push button switch element 21 and a variable resistance element R4 having a control calibrated in units of weight. Electrically connected to the servo amplifier 19 is an indicator 22 containing meters that indicate whether the product is above or below the predetermined weight. Also electrically connected to the servo amplifier is a reversible servo motor 23, the servo motor is in turn mechanically connected to the manual control shaft 24 of the feeder for the cigarette fabricating machine by way of the gears 25 and 26. In this way the varying electrical current from the transducer 1 causes the motor to rotate in a forward and a reverse direction to rotate the feeder control shaft and regulate the tobacco being fed by the feeder and thus regulate the weight of a unit length of cigarette tube filled with tobacco.

In the embodiment illustrated, the weighing unit A is postioned midway between the sealer unit B and cutter unit C of a cigarette making machine and positioned vertically so that it supports the cigarette tube 33 between the end 30 of the sealer anvil 30 and the orifice 31 of the cutter unit C. With the weight unit in the above described position, the weight of the cigarette tube is continuously impressed on the weight platform 14 of the weighing unit A. Reaction to the friction thrust of the cigarette tube 33 on the weighing platform 15 is taken by the flexible thrust struts 18, 18 and thrust strut bracket 34. Thus, as the cigarette tube 33 longitudinally passes across the weighing platform 15, the axial vector component of the force exerted therefrom will be cancelled by the reaction force of the thrust struts 18, 18. The vertical vector component exerted by the weight of the thrust struts 18, 18 upon the weighing platform are nulled out during the balancing of the transducer bridge 1. The entire weighing unit is housed and protected by the protective cylinder 35 which is provided with an inlet orifice 36A and an exit orifice 36 for the cigarette tube and a mounting bracket 38 for attachment to the frame of the machine (not shown). The weight transducer and weighing elements are fixedly attached to the mounting bracket 38 and positioned within the protective cylinder 35 by the support rod 39.

In the embodiment illustrated, the weight determining unit A is positioned between the sealer B and the cutter C of the cigarette making machine, however, it is to be understood that the unit A can be placed at any position on the machine where the cigarette is in tubular form and is free to impose its weight on the weight platform 15 of the weight unit A.

The embodiment illustrated employs a floating control; however, conventional instruments such as potentiometer controllers, capacity type low voltage level measuring devices, electronic controlling devices and other instruments commonly used to measure small electrical potentials can be used. The controllers for control of the electrical current emanating from the weight control unit can be of the proportional, reset, derivative, and any combination thereof, as commonly recognized in the art of control. Weight sensing devices of the pneumatic type commonly used can be employed in place of the electrical devices with corresponding change of the other components.

Although my invention has been described in considerable detail, such description is intended as being illustrative rather than limiting, since the invention may be variously embodied, and the scope of the invention is to be determined as claimed.

I claim as my invention:

1. In a cigarette machine continuously extruding a cigarette tube from a sealer unit and having a cutter unit spaced therefrom for longitudinally cutting the cigarette tube into individual cigarettes with feeding means to regulate the weight of tobacco per unit length of the cigarette tube, a weighing device comprising a housing, a frame secured within said housing, a flexible horizontal positioning member secured to each end of said frame, an armature vertically moveable within said frame and secured at its upper and lower portions respectively to each of said horizontal positioning members, restrictive means on said frame to limit excessive movement of said armature within said frame, a pair of tension wire elements each secured at one end to the upper portion of said frame and at the other end to the lower portion of said armature, a second pair of tension wire elements each secured at one end to the upper portion of said armature and at the other end to the lower portion of said frame, a shaft vertically extending from said armature, and a weighing platform suspended from said shaft intermediate the sealer unit and the cutter unit, said platform carrying the cigarette tube during its longitudinal travel between the sealer and cutter units, flexible thrust struts secured at one end of said platform and at the other end to said housing, said first mentioned tension wire elements being coupled with said second mentioned tension wire elements to define a 4-arm Wheatstone bridge, an input voltage applied across the external junctures of said first and second mentioned pairs of tension wire elements, an output voltage taken across the junctures of the medial connections of the first mentioned wire elements and the second mentioned wire elements respectively, a bridge balancing means to nullify the weight of said armature and suspensions therefrom, a phase sensitive servo amplifier, and a reversible servo motor electrically coupled to said servo amplifier and geared to the tobacco feeding means, the output from said bridge being applied to said servo amplifier whereby the feeding means will be continuously and automatically regulated to feed the desired weight of tobacco per unit length of cigarette tube.

2. In a cigarette machine continuously extruding a cigarette tube from a sealer unit and having a cutter unit spaced therefrom for longitudinally cutting the tube into individual cigarettes with feeding means to regulate the weight of tobacco per unit length of the cigarette tube, a weighing device comprising a housing, a frame secured within said housing, an armature flexibly supported and vertically moveable in said frame, a pair of tension wire elements secured respectively upon the upper portion of said frame and said armature, and a second pair of tension wire elements secured respectively upon said armature and the lower portion of said frame, a weighing platform suspended from said frame intermediate the sealer and cutter units, said platform carrying the cigarette tube during its longitudnial travel between said sealer and cutter units, each of said pairs of tension wire elements being coupled to define a 4-arm Wheatstone bridge, an input voltage across a pair of arms of said bridge, and an output voltage taken across a second pair of arms of said bridge 90° from said first pair of arms, balancing means to nullify the weight of the armature and suspensions therefrom, and phase sensitive servo motor means geared to the tobacco feeding means, the output from said Wheatstone bridge being applied to said servo motor means whereby the feeding means will be continuously and automatically regulated to feed the desired weight of tobacco per unit length of cigarette tube.

3. In a cigarette machine continuously extruding a cigarette tube from a sealer unit and having a cutter unit spaced therefrom for longitudinally cutting the tube into individual cigarettes with feeding means to regulate the weight of tobacco per unit length of the cigarette tube, a weighing device comprising a housing, strain gage means secured within said housing, a weighing platform suspended upon said strain gage means, said weighing platform being interposed intermediate the cutter and sealer units and carrying the cigarette tube during its longitudinal travel therebetween, thrust strut means on said platform and secured to said housing to eliminate the longitudinal force of the cigarette tube upon said weighing platform, said strain gage means being arranged in a 4-arm Wheatstone bridge, an input voltage being applied across a pair of arms thereof and an output voltage taken across a second pair of arms 90° displaced therefrom, balancing means to nullify the weight of the armature and suspensions therefrom, and phase sensitive servo motor means geared to the tobacco feeding means, the output from said Wheatstone bridge being applied to said servo motor means whereby the feeding means will be continuously and automatically regulated to feed the desired weight of tobacco per unit length of cigarette tube.

4. In a cigarette machine continuously extruding a cigarette tube from a sealer unit and having a cutter unit spaced therefrom for longitudinally cutting the tube into individual cigarettes with feeding means to regulate the weight of tobacco per unit length of the cigarette tube, a weighing device comprising a housing, strain gage means secured within said housing, a weighing platform suspended upon said strain gage means, said weighing platform being interposed intermediate the cutter and sealer units and carrying the cigarette tube during its longitudinal travel therebetween, said strain gage means being arranged in a 4-arm Wheatstone bridge, an input voltage being applied across a pair of arms thereof and an output voltage taken across a second pair of arms 90° displaced therefrom, balancing means to nullify the weight of the armature and suspensions therefrom, and phase sensitive servo motor means geared to the tobacco feeding means, the output from said Wheatstone bridge being applied to said servo motor means whereby the feeding means will be continuously and automatically regulated to feed the desired weight of tobacco per unit length of cigarette tube.

References Cited in the file of this patent
UNITED STATES PATENTS

| | | |
|---|---|---|
| 2,598,812 | Marco et al. | June 3, 1952 |
| 2,601,786 | Best | July 1, 1952 |
| 2,616,683 | Le Fevre | Nov. 4, 1952 |
| 2,667,172 | Broekhuysen | Jan. 26, 1954 |
| 2,704,079 | Molins | Mar. 15, 1955 |
| 2,745,411 | Gilman | May 15, 1956 |